United States Patent  (10) Patent No.: US 7,937,221 B2
Zhdanov  (45) Date of Patent: May 3, 2011

(54) METHOD AND APPARATUS FOR GRADIENT ELECTROMAGNETIC INDUCTION WELL LOGGING

(75) Inventor: Michael Zhdanov, Salt Lake City, UT (US)

(73) Assignee: Technoimaging, LLC, Salt Lake City, UT (US)

( * ) Notice: Subject to any disclaimer, the term of this patent is extended or adjusted under 35 U.S.C. 154(b) by 1034 days.

(21) Appl. No.: 10/590,333

(22) PCT Filed: Feb. 23, 2004

(86) PCT No.: PCT/GB2004/000724
§ 371 (c)(1),
(2), (4) Date: May 3, 2007

(87) PCT Pub. No.: WO2005/083467
PCT Pub. Date: Sep. 9, 2005

(65) Prior Publication Data
US 2008/0211507 A1  Sep. 4, 2008

(51) Int. Cl.
*G01V 1/40* (2006.01)
(52) U.S. Cl. .......................................................... 702/6
(58) Field of Classification Search ........................ 702/6
See application file for complete search history.

(56) References Cited

U.S. PATENT DOCUMENTS

| | | |
|---|---|---|
| 5,260,661 A | 11/1993 | Vail, III |
| 5,652,519 A | 7/1997 | Warren et al. |
| 5,666,057 A | 9/1997 | Beard et al. |
| 5,781,436 A | 7/1998 | Forgang et al. |
| 5,886,526 A | 3/1999 | Wu |
| 5,966,013 A | 10/1999 | Hagiwara |
| 5,999,883 A | 12/1999 | Gupta et al. |
| 6,147,496 A | 11/2000 | Strack et al. |
| 6,393,364 B1 | 5/2002 | Gao et al. |
| 6,556,016 B2 | 4/2003 | Gao et al. |
| 2003/0011371 A1 | 1/2003 | Rosthal et al. |
| 2003/0030439 A1 | 2/2003 | Gao et al. |
| 2005/0049792 A1* | 3/2005 | Yu et al. ............................. 702/7 |

OTHER PUBLICATIONS

Intl Search Report, Sep. 8, 2006, Oxford Geoservice Limited.
Michael Zhdanov, David Kennedy and Ertan Peksen, "Foundations of Tensor Induction Well-Logging", Petrophysics, vol. 42, No. 6, Nov.-Dec. 2001, p. 588-610.
Resp to ISR, Nov. 17, 2004.
Intl Search Rpt, Sep. 2, 2004.

* cited by examiner

*Primary Examiner* — Aditya Bhat
(74) *Attorney, Agent, or Firm* — GableGotwals (57) ABSTRACT

The method and apparatus for determining the conductivity of anisotropic formations surrounding a borehole. The method comprises measuring the gradient of the magnetic field by an electromagnetic logging tool in a borehole in the subsurface formation. The instrument comprises one or several closely positioned parallel receiver coils and one or several closely positioned parallel transmitter coils with the magnetic moment direction of the transmitter coils parallel or different from the magnetic moment direction of the receiver coils. In a preferred embodiment a gradient induction instrument consists of a tri-axial transmitter array and up to 27 pairs of receiver coils, measuring some or all magnetic gradient components: formula (I).

6 Claims, 10 Drawing Sheets

METHOD AND APPARATUS FOR GRADIENT ELECTROMAGNETIC INDUCTION WELL LOGGING

BACKGROUND OF THE INVENTION

The present invention relates in general to electromagnetic (EM) geophysical method of determining the electrical conductivity (or resistivity) of earth formations penetrated by a well bore. The method can be applied for studying the underground geological structures in mineral, hydrocarbons and groundwater exploration, for example, for determining the low conductive zones associated with oil and gas reservoirs.

Formation conductivity (or resistivity) determination from a wellbore is one of the oldest geophysical techniques to be applied in oil and gas exploration and production. The idea and principles of a geophysical method of EM induction well logging were introduced in the pioneering paper by H. G. Doll, Introduction to Induction Logging of Wells Drilled with Oil Based Mud, Journal of Petroleum Technology, vol. 1, p. 148, Society of Petroleum Engineers, Richardson Tex. (1949). Over the decades, many modifications and improvements have been made in this area. These modifications can be found in the numerous patents, for example, U.S. Pat. No. 5,452,762 issued to Beard et al., U.S. Pat. No. 5,781,436 issued to Forgang et al., U.S. Pat. No. 6,556,016 B2 issued to Gao et al.

In conventional induction well logging, an instrument having transmitter coils and receiver coils substantially parallel to the borehole axis is lowered into the borehole and measures the magnetic field generated by the eddy currents induced in the earth formations. Certain earth formations containing petroleum and permitting the petroleum to flow through the rock comprising the formation have certain physical characteristics well known in the art. For example, hydrocarbon-bearing formations are typically very resistive, while water-bearing formations are typically very conductive. A limitation to the EM induction well logging method known in the art is that the response of the typical EM induction logging instrument is largely dependent on the conductive layers, while the effect of the nonconductive hydrocarbon-bearing reservoirs can be masked by the influence of the conductive layers.

At the same time, it is well known that the rock formations surrounding the borehole may be anisotropic with regard to the conduction of electrical currents. The phenomenon of electrical anisotropy is generally a consequence of either microscopic or macroscopic geometry, or a combination thereof. The reservoir anisotropy was identified as the major factor affecting the induction well logging data by Klein et al. (1997). Basically, the authors of the cited paper found that in a hydrocarbon-bearing reservoir at least two separate components of resistivity can influence the induction instrument: the resistivity measured with current flowing parallel to the bedding planes, which is called the transverse or horizontal resistivity $\rho_h$, and whose inverse is the horizontal conductivity, $\sigma_h = 1/\rho_h$; the resistivity measured with a current flowing perpendicular to the bedding plane, which is called the longitudinal or vertical resistivity, $\rho_v$, and whose inverse is the vertical conductivity $\sigma_v = 1/\rho_v$. The ration, $\lambda = \sqrt{\sigma_h/\sigma_v}$, is called the anisotropy coefficient of the medium. Klein et al. (1997) found that the anisotropy coefficient for a hydrocarbon-bearing reservoir could rich the value up to 100. In this situation the conventional induction well logging tool, oriented substantially perpendicular to the bedding planes, is sensitive to the horizontal resistivity of the formation only, while the instrument oriented at an angle with the bedding planes reads the apparent conductivity response, $\sigma_a$, which can be any value between $\sqrt{\sigma_h \sigma_v}$ and $\sigma_h$.

One solution to this limitation known in the art has emerged in recent years. It is based on introducing transverse transmitter coils and receiver coils, with magnetic moments oriented perpendicular to the borehole axis. The idea of transverse induction coil measurements appeared first in the former Soviet Union (Eidman, 1970; Kaufman and Kaganskii, 1972; Tabarovsky et al., 1976). It has received further development in many inventions. Forgang et al. (U.S. Pat. No. 5,781,436) introduced method and apparatus for transverse electromagnetic induction well logging. Wu (U.S. Pat. No. 5,886,526) described a method of determining anisotropic properties of anisotropic earth formations using a multi-spacing induction tool. Hagiwara (U.S. Pat. No. 5,966,013) disclosed a method of determining certain anisotropic properties of formation. Gao et al. (U.S. Pat. No. 6,393,364) introduced an iterative method for determining the horizontal and vertical resistivity. Gupta et al. (U.S. Pat. No. 5,999,883) considered a triad induction tool. Gao et al. (U.S. Pat. No. 6,556,016 B2) introduced an induction method for determining the dip angle of an anisotropic earth formation surrounding a wellbore. In yet another development Zhdanov, Kennedy, and Peksen, in the article entitled "Foundations of the tensor induction well logging," developed the basic physical and mathematical principles of electromagnetic tensor induction well logging in anisotropic formation.

Another limitation of the induction well logging data, known in the art, is the significant borehole effect that can distort the response of the formation surrounding the borehole. This effect has to be eliminated from the data, otherwise interpretation would be erroneous. The methods for the reduction of the wellbore effect were developed by Tabarovsky and Epov (1972). They introduced a "frequency focusing" technique based on induction voltage measurements at two frequencies and combining the observed signal in a manner so that the effects of eddy currents flowing within the wellbore can be substantially eliminated from the final result. This "dual frequency" signal is widely used in interpretation of conventional induction logging data and in transverse induction coil measurements as well (Forgang et al., U.S. Pat. No. 5,781,436).

The above references are incorporated herein by reference.

The foregoing attempts to determine vertical and horizontal resistivity around a deviated borehole and/or the dip angle of the formation met with varying degrees of success. However, there remains a need for improved methods and apparatus for high resolution hydrocarbon-bearing reservoir identification and characterization. A new technique is therefore needed.

SUMMARY OF THE INVENTION

The present invention provides a new method and apparatus for determining the conductivity of anisotropic formations surrounding a borehole. The method comprises measuring the gradient of the magnetic field by an electromagnetic gradient induction logging tool in a borehole in the subsurface formations. The method of the invention is capable of measuring the conductivity distribution of earth formations penetrated by a wellbore with higher resolution than conventional induction logging data, because the gradient of the magnetic field is significantly more sensitive to the conductivity variations than the magnetic field itself.

An embodiment of the invention provides an apparatus which includes at least one transmitter coil and two closely positioned parallel receiver coils separated by a small vector Δr, with the magnetic moment direction of the transmitter parallel or different from the magnetic moment direction of the receivers. The transmitter generates a harmonic (frequency domain) primary electromagnetic (EM) field which propagates through the anisotropic formation surrounding the borehole. The EM field scattered by the formations is recorded by the receivers. The pair of closely located receivers with the parallel magnetic moments measures the gradient in the direction Δr of the component of the magnetic field, parallel to the receiver moment direction. A central processing unit collects the recorded amplitudes and phases of the EM field scattered by the formation and determines the EM parameters of the formation, such as horizontal and vertical conductivities and the dip angle of the bedding.

In another embodiment of the invention, the frequency domain current in the transmitter is generated for at least several frequencies, and the receivers measure the signal at several frequencies. The multi-frequency gradient measurements are used for frequency gradient EM sounding of the medium at different distances from the wellbore. In addition, the multi-frequency measurements are combined in the gradient magnetic field signal with a reduced borehole effect.

Another embodiment of the invention provides a new method and apparatus for measuring the conductivity of anisotropic formations surrounding a borehole. The apparatus comprises at least one receiver coil and two closely positioned parallel transmitter coils, separated by a small vector Δr, with the magnetic moment direction of the transmitters parallel or different from the magnetic moment direction of the receiver. The two transmitters generate successively a harmonic (frequency domain) primary EM field which propagates through the anisotropic formation, surrounding the borehole. The EM field scattered by the formations is recorded by the receiver. Due to the reciprocity principal, the difference of the induced voltages in the receivers, measured successively for the signals from the two transmitters, is proportional to the gradient in the direction Δr of the component of the magnetic field, parallel to the receiver moment direction. A central processing unit collects the recorded amplitudes and phases of EM field scattered by the formation and determines the EM parameters of the formation, such as horizontal and vertical conductivities and the dip angle of the bedding.

In another embodiment, the frequency domain current in the transmitters is generated at several frequencies. The multi-frequency gradient measurements are used for frequency gradient EM sounding of the medium at different distances from the wellbore. In addition, the multi-frequency measurements are combined in the gradient magnetic field signal with a reduced borehole effect.

Another embodiment of the invention provides a new method and apparatus for measuring the conductivity of an anisotropic formation surrounding a borehole. The apparatus comprises a tri-axial EM induction transmitter and a pair of closely located tri-axial EM induction receivers, separated by a small vector, Δr. One set of tri-axial receivers detects three components of the magnetic field due to each of three transmitters for a total of nine signals, which can be mathematically organized as a tensor array which we call the induction tensor. The entire instrument comprising a pair of tri-axial receivers detects a gradient in the direction Δr of each of three components of the magnetic field in the receivers due to each of the three transmitters for a total of nine gradient signals. A central processing unit collects the recorded amplitudes and phases of the EM field scattered by the formation and determines the EM parameters of the formation, such as horizontal and vertical conductivities and the dip angle of the bedding.

Another embodiment of the invention provides a new method and apparatus for measuring the conductivity of an anisotropic formation surrounding a borehole. The apparatus comprises a pair of closely located tri-axial EM induction transmitters, separated by a small vector, Δr, and a tri-axial EM induction receiver. Due to the reciprocity principle, this instrument detects a gradient in the direction Δr of each of three components of the magnetic field in the receiver due to each of the three transmitters for a total of nine gradient signals. A central processing unit collects the recorded amplitudes and phases of the EM field scattered by the formation and determines the EM parameters of the formation, such as horizontal and vertical conductivities and the dip angle of the bedding.

In another embodiment the frequency domain current in the transmitters is generated at several frequencies. The multi-frequency measurements in the tri-axial receivers are combined in the nine gradient magnetic field signals which are used for the frequency gradient EM sounding of the medium at different distances from the wellbore. In addition, the multi-frequency measurements are combined in the gradient magnetic field signal with a reduced borehole effect.

Another embodiment of the invention provides a new method and apparatus for measuring the conductivity of an anisotropic formation surrounding a borehole. The apparatus comprises a tri-axial EM induction transmitter and nine pairs of closely located parallel receiver coils. Three pairs of the parallel receivers have the same orientation along the axis x, while they are separated by small distances in the directions x, y, and z, respectively, where the x, y, and z axes correspond to the coordinate system of the tool. Another three pairs of the parallel receivers have the same orientation along the axis t, and they are separated by small distances in the directions x, y, and z respectively. The last three pairs of the parallel receivers have the same orientation along the axis z, and they are separated by small distances in the directions x, y, and z respectively. This instrument detects a gradient of the induction tensor, which is a tensor of rank 3 with a total number of 27 gradient components. A central processing unit would collect the recorded amplitudes and phases of the EM field scattered by the formation and determine the EM parameters of the formation, such as horizontal and vertical conductivities and the dip angle of the bedding.

In another embodiment the frequency domain current in the transmitters is generated at several frequencies. The multi-frequency measurements in the tri-axial receivers are combined in the 27 gradient magnetic field signals with a reduced borehole effect.

BRIEF DESCRIPTION OF THE DRAWINGS

FIG. 7 shows the graphs of the theoretical gradient induction logging curves for a three-layer anisotropic model with the middle layer with the horizontal resistivity $\rho_h$=1 Ohm-m, vertical resistivity $\rho_v$=100 Ohm-m, and the thickness of 0.1 m. The horizontal and vertical resistivities of the upper and lower layers are equal to 1 Ohm-m, and 5 Ohm-m, respectively. Panel (a) presents horizontal resistivity variation versus depth and panel (b) shows vertical resistivity variation versus depth, wherein the bold solid lines display the true resistivity profile and the thin solid line shows the corresponding apparent resistivity profiles. The dual frequency $H_{zd}^z$ and $H_{xd}^x$ data are presented in panels (c) and (d), respectively; panels (e) and (f) illustrate the dual frequency gradient components versus depth, $\partial H_{zd}^z/\partial z$ and $\partial H_{xd}^x/\partial z$, respectively. The operating frequencies are 20 and 200 kHz.

FIG. 8 shows the graphs of the theoretical gradient induction logging curves for a three-layer anisotropic model with the middle layer having a horizontal resistivity of $\rho_h$=10 Ohm-m, a vertical resistivity of $\rho_v$=100 Ohm-m, and a thickness of 0.5 m. The horizontal and vertical resistivities of the upper and lower layers are equal to 1 Ohm-m and 5 Ohm-m, respectively. Panel (a) presents horizontal resistivity variation versus depth and panel (b) shows vertical resistivity variation versus depth, wherein the bold solid lines display the true resistivity profile and the thin solid line shows the corresponding apparent resistivity profiles. The dual frequency $H_{zd}^z$ and $H_{xd}^x$ data are presented in panels (c) and (d), respectively; panels (e) and (f) illustrates the dual frequency gradient components versus depth, $\partial H_{zd}^z/\partial z$ and $\partial H_{xd}^x/\partial z$, respectively. The operating frequencies are 20 and 200 kHz.

FIG. 9 shows the graphs of the theoretical gradient induction logging curves for a three-layer anisotropic model with the middle layer having horizontal resistivity of $\rho_h$=1 Ohm-m, a vertical resistivity of $\rho_v$=100 Ohm-m, and a thickness of 2 m. The horizontal and vertical resistivities of the upper and lower layers are equal to 1 Ohm-m and 5 Ohm-m, respectively. Panel (a) presents horizontal resistivity variation versus depth and panel (b) shows vertical resistivity variation versus depth, wherein the bold solid lines display the true resistivity profile and the thin solid line shows the corresponding apparent resistivity profiles. The dual frequency $H_{zd}^z$ and $H_{xd}^x$ data are presented in panels (c) and (d), respectively; panels (e) and (f) illustrate the dual frequency gradient components versus depth, $\partial H_{zd}^z/\partial z$ and $\partial_{xd}^x/\partial z$, respectively. The operating frequencies are 20 and 200 kHz. The observed and predicted data are shown by dotted and solid lines in panels (c) and (d), (e) and (f), respectively.

FIG. 10 shows the graphs of the theoretical gradient induction logging curves for a three-layer anisotropic model with the middle layer having horizontal resistivity of $\rho_h$=10 Ohm-m, a vertical resistivity of $\rho_v$=100 Ohm-m, and a thickness of 2 m. The horizontal and vertical resistivities of the upper and lower layers are equal to 1 Ohm-m and 5 Ohm-m, respectively. Panel (a) presents horizontal resistivity variation versus depth and panel (b) shows vertical resistivity variation versus depth, wherein the bold solid lines display the true resistivity profile and the thin solid line shows the corresponding apparent resistivity profiles. The dual frequency $H_{zd}^z$ and $H_{xd}^x$ data are presented in panels (c) and (d), respectively; panels (e) and (f) illustrates the dual frequency gradient components versus depth, $\partial H_{zd}^z/\partial z$ and $\partial H_{xd}^x/\partial z$, respectively. Operating frequencies are 20 and 200 kHz. The observed and predicted data are shown by dotted and solid lines in panels (c) and (d), (e) and (f), respectively.

DESCRIPTION OF THE PREFERRED EMBODIMENT

The conceptual sketches for coil arrangements for downhole gradient induction instruments are shown in FIGS. 1, 2, 3, 4 & 5.

Figure 1A:
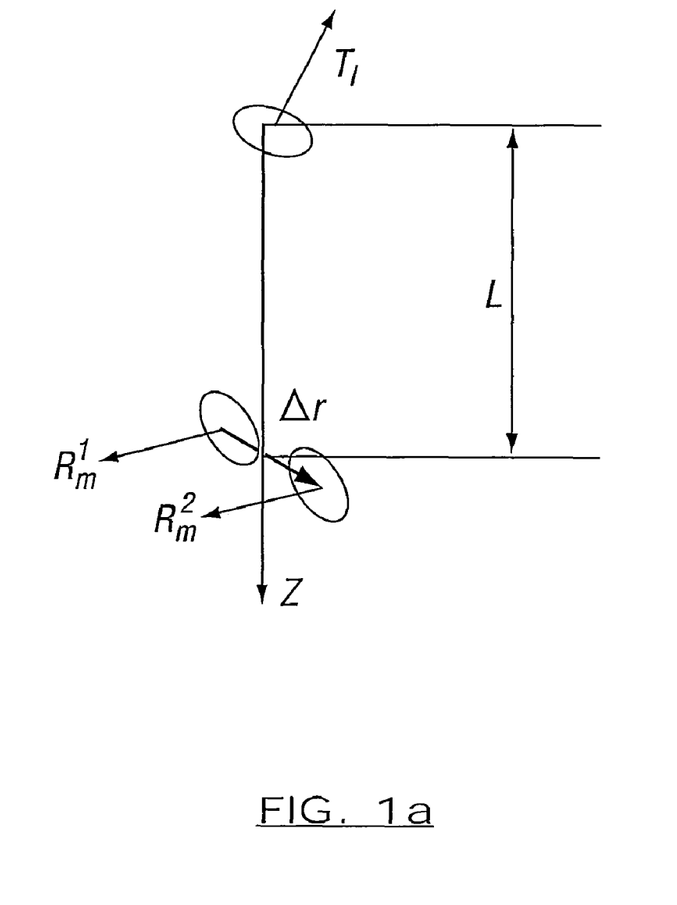
FIG. 1(a) illustrates the coil configuration of a gradient induction tool consisting of one transmitter coil and two closely positioned parallel receiver coils separated by a small vector Δr.

FIG. 1(a) illustrates a preferred embodiment in which a gradient induction instrument consists of one transmitter coil with the magnetic moment $T_l$, and two closely positioned parallel receiver coils with the magnetic moments $R_m^1$ and $R_m^2$, separated by a small vector, Δr, with the magnetic moment direction of the transmitter, $T_l$, parallel or different from the magnetic moment direction of the receivers. In the preferred embodiment, it is assumed that the distance between two parallel receivers is much smaller than the distance L between the transmitter and a center of the vector Δr, connecting two receivers: |Δr|<<L. This requirement ensures that the receiver pair measures the gradient of the magnetic field component $H_m$ at the direction of the vector Δr:

$$\frac{\partial H_m}{\partial n_{\Delta r}} \approx \frac{H_m^2 - H_m^1}{|\Delta r|}, \quad (1)$$

where $H_m^1$ and $H_m^2$ are the components of the magnetic field, parallel to the receiver moment direction, which are measured by receivers $R_m^1$ and $R_m^2$, respectively, and $n_{\Delta r}$ is a unit vector in the direction of vector Δr.

Figure 1B:
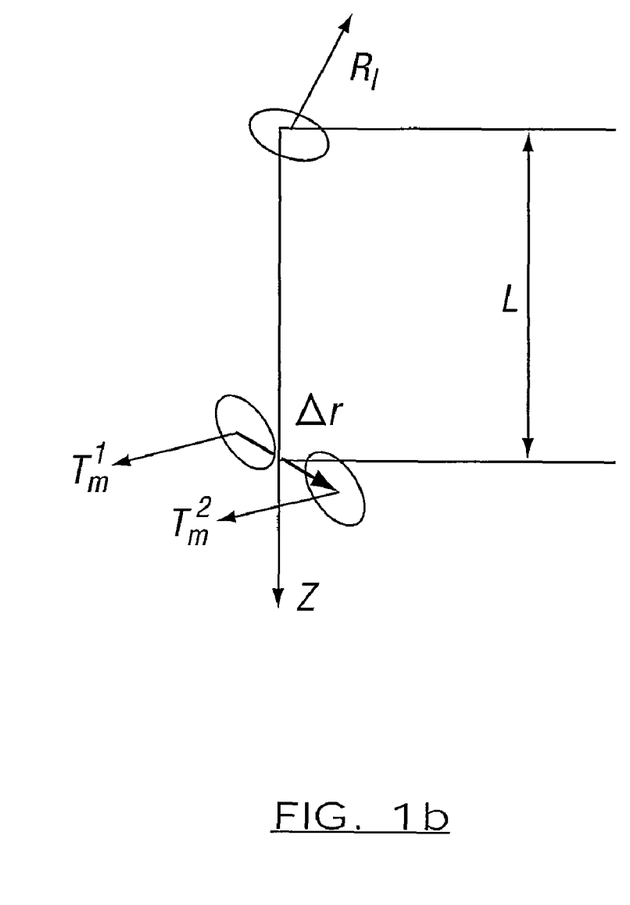
FIG. 1(b) shows the coil configuration of a reciprocal gradient induction tool consisting of one receiver coil and two closely positioned parallel transmitter coils separated by a small vector Δr.

FIG. 1(b) illustrates a preferred embodiment in which a reciprocal gradient induction tool consists of one receiver coil with the magnetic moment $R_l$, and two closely positioned parallel transmitter coils with the magnetic moments $T_m^1$ and $T_m^2$, separated by a small vector Δr, with the magnetic moment direction of the receiver, $R_l$ parallel or different from the magnetic moment direction of the transmitters. In the preferred embodiment, it is assumed that the distance between two parallel transmitters is much smaller than the distance L between the receiver and a center of the vector Δr, connecting two transmitters: |Δr|<<L. The transmitters $T_m^1$ and $T_m^2$ operate successively, so that the receiver $R_l$ measures the magnetic fields, generated by each of these transmitters separately. Due to the reciprocity principle, the difference between the two measurements of the magnetic field in the receiver due to two different transmitters is equal to the gradient of the magnetic field component $H_m$ at the direction of the vector $\Delta r$, measured by receivers $R_m^1$ and $R_m^2$, of the coil configuration shown in FIG. 1(a).

Figure 2A:
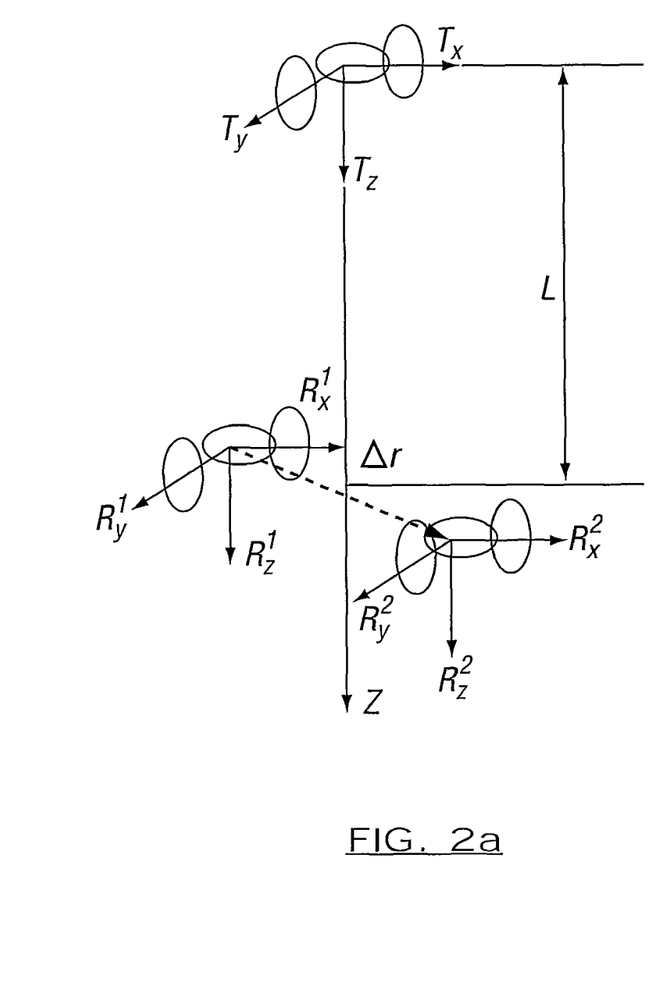
FIG. 2(a) presents the coil configuration of a tri-axial gradient induction tool consisting of a tri-axial EM induction transmitter and a pair of closely located tri-axial EM induction receivers, separated by a small vector Δr.

FIG. 2(a) illustrates the preferred embodiment in which the instrument consists of a tri-axial EM induction transmitter and a pair of closely located tri-axial EM induction receivers, separated by a small vector $\Delta r$. In the transmitter array, there is a triad of transmitter coils, $T_x$, $T_y$, and $T_z$, each oriented along a respective axis. In each receiver array a similarly oriented triad of receiver coils, $R_x^1$, $R_y^1$, and $R_z^1$ and $R_x^2$, $R_y^2$, and $R_z^2$, is provided. It is assumed that the three coils in each triad represent actual coils oriented in mutually perpendicular directions, with the z-axis corresponding to the axis of the borehole. However, this coil arrangement is not a requirement of the invention, as any coil orientation can be synthesized by performing a suitable rotation on coils with different triad orientations. Such rotations are described in depth in Zhdanov et al. (2001), which is incorporated herein by reference.

In a preferred embodiment, each of the coils in the transmitter triads $T_x$, $T_y$, and $T_z$ is parallel to the corresponding coils in the receiver triad $R_x^1$, $R_y^1$, and $R_z^1$, and/or $R_x^2$, $R_y^2$, and $R_z^2$ and each is displaced from the center of the vector $\Delta r$, connecting two receiver triads by a distance L.

One set of tri-axial receivers detects three components of the magnetic field due to each of three transmitters for a total of nine signals, which can be mathematically organized as a tensor array which we call the induction tensor, $\hat{H}$. This tensor can be written in matrix notation as $$\hat{H} = \begin{bmatrix} H_x^x & H_x^y & H_x^z \\ H_y^x & H_y^y & H_y^z \\ H_z^x & H_z^y & H_z^z \end{bmatrix},$$

where superscripts refer to the transmitter components and subscripts refer to the receiver components. In the preferred embodiment, it is assumed that the distance between two triads of receiver coils is much smaller than the distance L between the transmitter triad and a center of the vector $\Delta r$, connecting two receiver triads: $|\Delta r| \ll L$. This requirement ensures that the receiver triads measure the gradient of the magnetic field components at the direction of the vector $\Delta r$, which form a gradient tensor $$\hat{G} = \frac{\partial \hat{H}}{\partial n_{\Delta r}} = \begin{bmatrix} \frac{\partial H_x^x}{\partial n_{\Delta r}} & \frac{\partial H_x^y}{\partial n_{\Delta r}} & \frac{\partial H_x^z}{\partial n_{\Delta r}} \\ \frac{\partial H_y^x}{\partial n_{\Delta r}} & \frac{\partial H_y^y}{\partial n_{\Delta r}} & \frac{\partial H_y^z}{\partial n_{\Delta r}} \\ \frac{\partial H_z^x}{\partial n_{\Delta r}} & \frac{\partial H_z^y}{\partial n_{\Delta r}} & \frac{\partial H_z^z}{\partial n_{\Delta r}} \end{bmatrix}, \text{ where} \quad (2)$$

$$\frac{\partial H_\alpha^\beta}{\partial n_{\Delta r}} \approx \frac{H_\alpha^{\beta 2} - H_\alpha^{\beta 1}}{|\Delta r|}, \alpha, \beta = x, y, z; \quad (3)$$

and $H_\alpha^{\beta 1}$ and $H_\alpha^{\beta 2}$ ($\alpha, \beta = x, y, z$) are the components of the magnetic field, which are measured by receivers $R_x^1$, and $R_y^1$ and $R_z^1$ and $R_x^2$, $R_y^2$, and $R_z^2$, respectively, and $n_{\Delta r}$ is a unit vector in the direction of vector $\Delta r$.

Figure 2B:
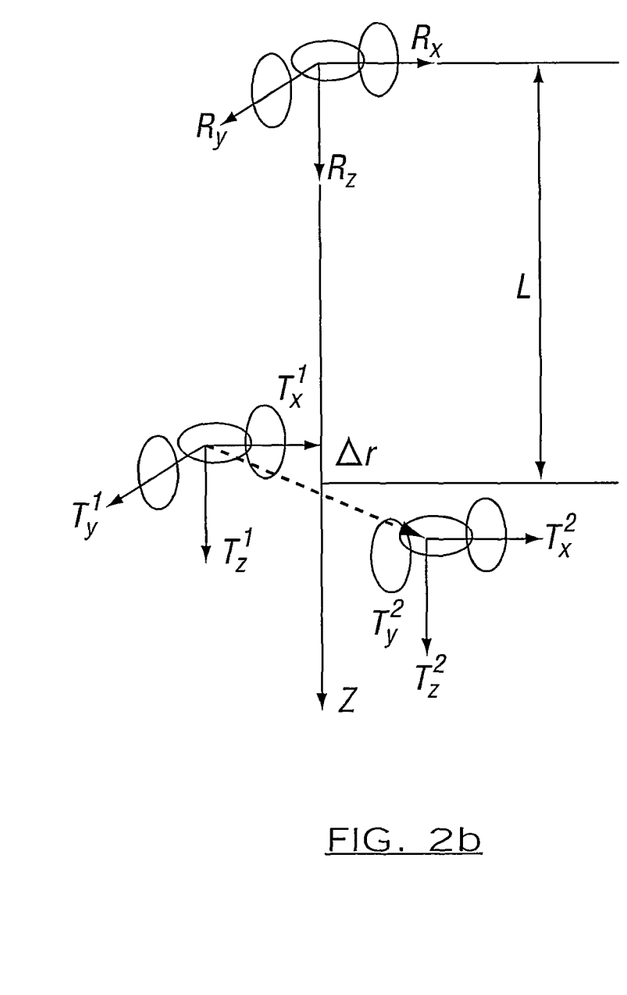
FIG. 2(b) shows the coil configuration of a reciprocal tri-axial gradient induction tool consisting of a tri-axial EM induction receiver and a pair of closely located tri-axial EM induction transmitters, separated by a small vector Δr.

An alternative embodiment is shown in FIG. 2(b) such that the tool consists of a tri-axial EM induction receiver and a pair of closely located tri-axial EM induction transmitters, separated by a small vector $\Delta r$. In the receiver array, there is a triad of receiver coils $R_x$, $R_y$, and $R_z$, each oriented along a respective axis. In each transmitter array a similarly oriented triad of transmitter coils $T_x^1$, $T_y^1$, and $T_z^1$ and $T_x^2$, $T_y^2$, and $T_z^2$, is provided. It is assumed that the three coils in each triad represent actual coils oriented in mutually perpendicular directions, with the z-axis corresponding to the axis of the borehole. However, this coil arrangement is not a requirement of the invention, as any coil orientation can be synthesized by performing a suitable rotation on coils with different triad orientations. Due to the reciprocity principle, the difference between the two measurements of the magnetic field in the receivers due to two different transmitters triads is equal to the gradient of the magnetic field components at the direction of the vector $\Delta r$, measured by receiver triads $R_x^1$, $R_y^1$ and $R_z^1$, and $R_x^2$, $R_y^2$ and $R_z^2$ of the coil configuration shown in FIG. 2(a).

Figure 3:
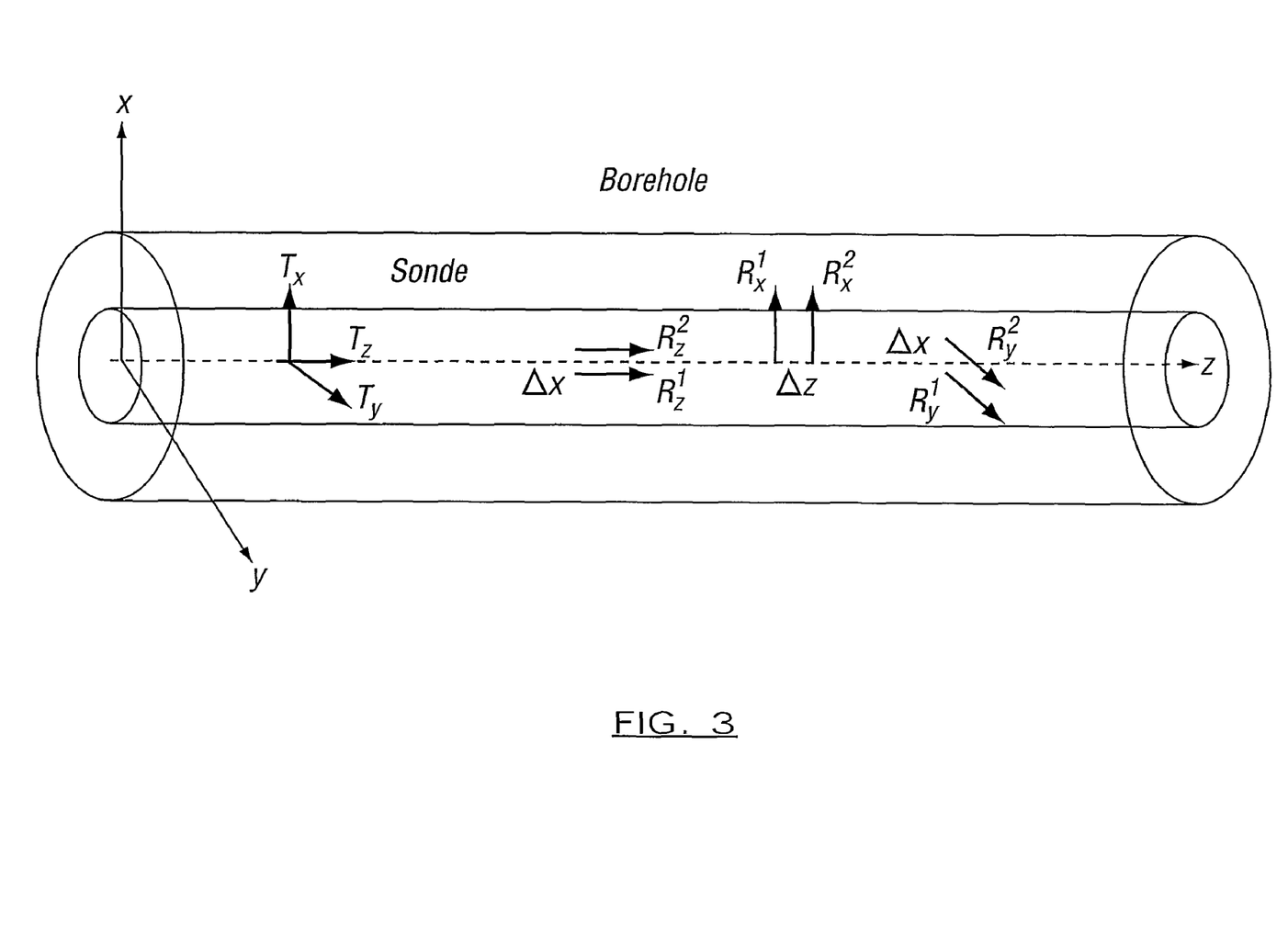
FIG. 3 presents a schematic diagram of an instrument with an arrayed induction coil configuration consisting of a tri-axial transmitter array and three pairs of receiver coils; the pair of receiver coils $R_z^1$ and $R_z^2$ is measuring the $\partial H_z^\beta/\partial x$ (β=x, y, z) components; the pair of receiver coils $R_x^1$ and $R_x^2$ is measuring the $\partial H_x^\beta/\partial z$, (β=x, y, z) components; the pair of receiver coils $R_y^1$ and $R_y^2$ is measuring the $\partial H_y^\beta/\partial x$, (β=x, y, z) components.
Figure 4:
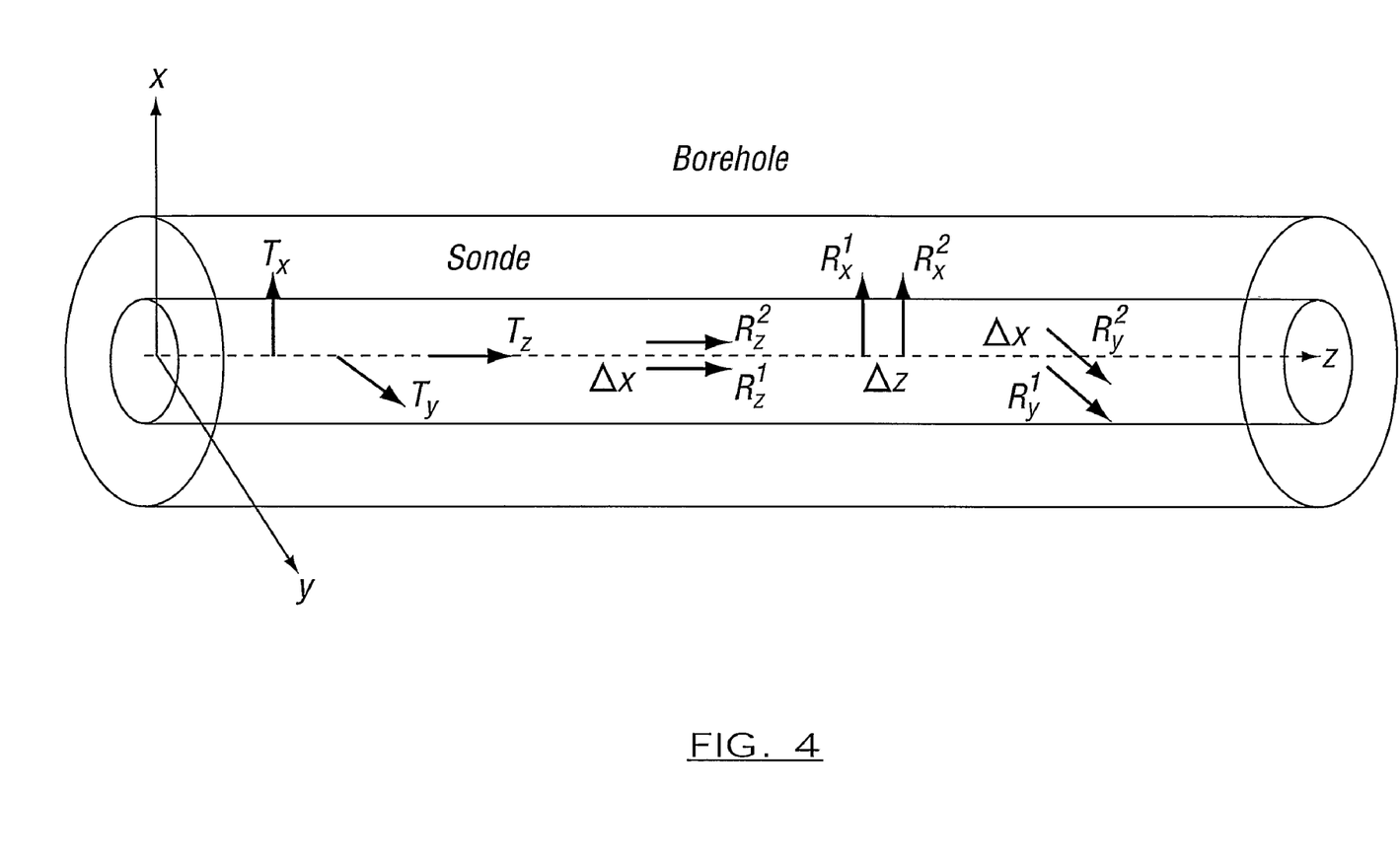
FIG. 4 presents a schematic diagram of an instrument with an arrayed induction coil configuration consisting of three mutually orthogonal transmitter coils, displaced along the z-axis and oriented in the x, y-, and z-directions, and three pairs of receiver coils; the pair of receiver coils $R_z^1$ and $R_z^2$ is measuring the $\partial H_z^\beta/\partial x$ (β=x, y, z) components; the pair of receiver coils $R_x^1$ and $R_x^2$ is measuring the $\partial H_x^\beta/\partial z$, (β=x, y, z) components; the pair of receiver coils $R_y^1$ and $R_y^2$ is measuring the $\partial H_y^\beta\partial x$, (β=x, y, z) components.
Figure 5:
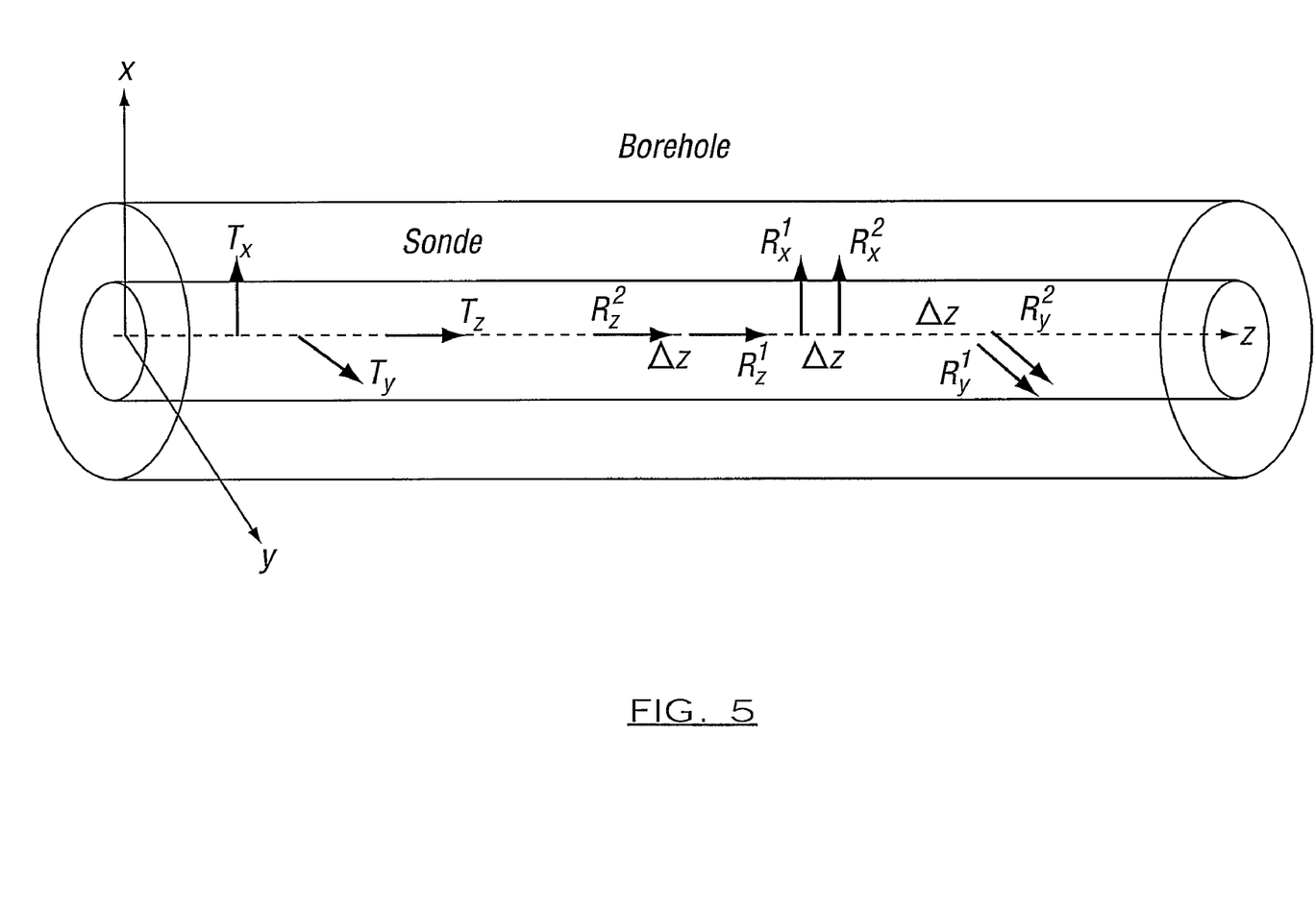
FIG. 5 presents a schematic diagram of an instrument with an arrayed induction coil configuration consisting of three mutually orthogonal transmitter coils, displaced along the z-axis and oriented in the x-, y-, and z-directions, and three pairs of receiver coils; the pair of receiver coils $R_z^1$ and $R_z^2$ is measuring the $\partial H_z^\beta/\partial z$, (β=x, y, z) components; the pair of receiver coils $R_x^1$ and $R_x^2$ is measuring the $\partial H_x^\beta/\partial z$, (β=x, y, z) components; the pair of receiver coils $R_y^1$ and $R_y^2$ is measuring the $\partial H_y^\beta/\partial z$, (β=x, y, z) components.

While particular embodiments of the present invention have been disclosed, it is to be understood that various different modifications are possible and are contemplated within the scope of the specification, drawings, abstract and appended claims. FIGS. 3, 4, and 5 provide conceptual sketches for several different coil arrangements for the gradient tensor induction well logging (GTIWL) downhole instruments, which are included in the preferred embodiments of this invention.

FIG. 3 illustrates a preferred embodiment in which the tool consists of a tri-axial transmitter array and three pairs of receiver coils. The pair of receiver coils $R_z^1$ and $R_z^2$ is measuring the $\partial H_z^\beta / \partial x \approx (H_z^{\beta 2} - H_z^{\beta 1})/\Delta x$, $\beta = x, y, z$, components. The pair of receiver coils $R_x^1$ and $R_x^2$ is measuring the $\partial H_x^\beta / \partial z \approx (H_x^{\beta 2} - H_x^{\beta 1})/\Delta z$, $\beta = x, y, z$, components; the pair of receiver coils $R_y^1$ and $R_y^2$ is measuring the $\partial H_y^\beta / \partial x \approx (H_y^{\beta 2} - H_y^{\beta 1})/\Delta x$, $\beta = x, y, z$, components.

FIG. 4 illustrates an alternative embodiment in which the tool consists of three mutually orthogonal transmitter coils, displaced along the z-axis and oriented in the x-, y-, and z-directions, and three pairs of receiver coils. The pair of receiver coils $R_z^1$ and $R_z^2$ is measuring the $\partial H_z^\beta / \partial x \approx (H_z^{\beta 2} - H_z^{\beta 1})/\Delta x$, $\beta = x, y, z$, components. The pair of receiver coils $R_x^1$ and $R_x^2$ is measuring the $\partial H_x^\beta / \partial z \approx (H_x^{\beta 2} - H_{xz}^{\beta 1})/\Delta z$, $\beta = x, y, z$, components; the pair of receiver coils $R_y^1$ and $R_y^2$ is measuring the $\partial H_y^\beta / \partial x \approx (H_y^{\beta 2} - H_y^{\beta 1})/\Delta x$, $\beta = x, y, z$, components.

FIG. 5 illustrates an alternative embodiment in which the tool consists of three mutually orthogonal transmitter coils, displaced along the z-axis and oriented in the x-, y-, and z-directions, and three pairs of receiver coils. The pair of receiver coils $R_z^1$ and $R_z^2$ is measuring the $\partial H_z^\beta / \partial z \approx (H_z^{\beta 2} - H_z^{\beta 1})/\Delta z$, $\beta = x, y, z$, components. The pair of receiver coils $R_x^1$ and $R_x^2$ is measuring the $\partial H_x^\beta / \partial z \approx (H_x^{\beta 2} - H_{xz}^{\beta 1})/\Delta z$, $\beta = x, y, z$, components; the pair of receiver coils $R_y^1$ and $R_y^2$ is measuring the $\partial H_y^\beta / \partial z \approx (H_y^{\beta 2} - H_y^{\beta 1})/\Delta z$, $\beta = x, y, z$, components.

In another preferred embodiment the tool consists of a tri-axial transmitter array and up to 27 pairs of receiver coils, measuring some or all magnetic gradient components: $\partial H_\alpha^\beta / \partial \gamma$ ($\alpha, \beta, \gamma = x, y, z$). In yet another preferred embodiment the tool consists of three mutually orthogonal transmitter coils, displaced along the z-axis and oriented in the x-, y-, and z-directions, and up to 27 pairs of receiver coils, measuring some or all magnetic gradient components: $\partial H_\alpha^\beta / \partial \gamma$ ($\alpha, \beta, \gamma = z, y, z$).

We should notice that it is well known in the art of exploration geophysics that the gradient of the magnetic field is significantly more sensitive to the local variations of the conductivity than the magnetic field itself. Thus, the gradient tensor induction well logging (GTIWL) measurements are capable of measuring the conductivity distribution of earth formations penetrated by a wellbore with a higher resolution than conventional induction logging data.

For interpretation of the instrument measurements, we, generally, consider an appropriate formation model. The interpretation problem is formulated for the GTIWL data collected in a deviated borehole within a planar stratified medium with electrical anisotropy in each layer. We assume that a model of the horizontally layered medium is characterized in the coordinate system $\{x, y, z\}$ by 1-D piecewise-constant distribution of the conductivity along the z direction. Each layer has transverse isotropic (TI) conductivity defined by the conductivity tensor $\hat{\sigma}_i(z)$ $$\hat{\sigma}_j = \begin{pmatrix} \sigma_h^i & 0 & 0 \\ 0 & \sigma_h^i & 0 \\ 0 & 0 & \sigma_v^i \end{pmatrix} \quad (4)$$

and the corresponding piecewise-constant anisotropy coefficient $$\lambda_i = (\sigma_h^i/\sigma_v^i)^{1/2}, \, i=1, \ldots, N. \quad (5)$$

The positions of the layer's boundaries are given by equations $$z = z_i, \, i=1, \ldots, N-1. \quad (6)$$

We consider first the response of a tri-axial gradient induction instrument shown in FIG. 2(a) in an unbounded, homogeneous, transversely isotropic (TI) conductive medium. Every receiver triad of this instrument detects three components of the magnetic field due to each of three transmitters for a total of nine signals:

$$\hat{H}^{(1)} = \begin{bmatrix} H_{x(1)}^x & H_{x(1)}^y & H_{x(1)}^z \\ H_{y(1)}^x & H_{y(1)}^y & H_{y(1)}^z \\ H_{z(1)}^x & H_{z(1)}^y & H_{z(1)}^z \end{bmatrix}, \text{ and}$$

$$\hat{H}^{(2)} = \begin{bmatrix} H_{x(2)}^x & H_{x(2)}^y & H_{x(2)}^z \\ H_{y(2)}^x & H_{y(2)}^y & H_{y(2)}^z \\ H_{z(2)}^x & H_{z(2)}^y & H_{z(2)}^z \end{bmatrix},$$

where superscripts indicate the transmitter components and subscripts represent the receiver components, and index (1) or (2) corresponds to the first or the second receiver triad. Using formula (3), these measurements can be transformed into the gradient tensor $\hat{G}$ described by formula (2).

In the Cartesian system of coordinates (x, y, z), with the axis z directed along the axis of symmetry of the TI conductive medium, the expressions for the induction tensor components are written as (Zhdanov et al., 2001)

$$H_x^x = \frac{e^{ik_\upsilon s}}{4\pi}\left[\frac{i\omega\mu_0\sigma_h}{\lambda s} + \frac{ik_h s - k_h k_\upsilon x^2}{sp^2} - \frac{2ik_h x^2}{p^4}\right] - \quad (7)$$
$$\frac{e^{ik_h r}}{4\pi}\left[\frac{ik_h r - k_h^2 x^2}{rp^2} - \frac{2ik_h x^2}{p^4} - \frac{ik_h}{r^2} + \frac{(k_h^2 x^2 + 1)}{r^3} + \frac{3ik_h x^2}{r^4} - \frac{3x^2}{r^5}\right],$$

$$H_y^x = H_x^y = xy\frac{e^{ik_\upsilon s}}{4\pi p^2}\left[-\frac{k_\upsilon k_h}{s} - \frac{2ik_h}{p^2}\right] - \quad (8)$$
$$xy\frac{e^{ik_h r}}{4\pi}\left[-\frac{k_h^2}{rp^2} - \frac{2ik_h}{p^4} + \frac{k_h^2}{r^3} + \frac{3ik_h}{r^4} - \frac{3}{r^5}\right],$$

-continued $$H_x^z = H_z^x = -xz\frac{e^{ik_h r}}{4\pi r^3}\left[k_h^2 + \frac{3ik_h}{r} - \frac{3}{r^2}\right], \quad (9)$$

$$H_y^y = \frac{e^{ik_\upsilon s}}{4\pi}\left[\frac{i\omega\mu_0\sigma_h}{\lambda_s} + \frac{ik_h s - k_h k_\upsilon y^2}{sp^2} - \frac{2ik_h y^2}{p^4}\right] - \quad (10)$$
$$\frac{e^{ik_h r}}{4\pi}\left[\frac{ik_h r - k_h^2 y^2}{rp^2} - \frac{2ik_h y^2}{p^4} - \frac{ik_h}{r^2} + \frac{(k_h^2 y^2 + 1)}{r^3} + \frac{3ik_h y^2}{r^4} - \frac{3y^2}{r^5}\right],$$

$$H_z^y = H_y^z = -yz\frac{e^{ik_h r}}{4\pi r^3}\left[k_h^2 + \frac{3ik_h}{r} - \frac{3}{r^2}\right], \quad (11)$$

$$H_z^z \frac{e^{ik_h r}}{4\pi r} \cdot \left[i\omega\mu_0\sigma_h + \frac{ik_h}{r} - \frac{(k_h^2 z^2 + 1)}{r^2} - \frac{3ik_h z^2}{r^3} + \frac{3z^2}{r^4}\right], \quad (12)$$

where we use the following notations: $\rho=\sqrt{x^2+y^2}$, $s=\sqrt{\rho^2+\lambda^2 z^2}$, $\lambda^2=\sigma_h/\sigma_v$, $r=\sqrt{\rho^2+z^2}$, $k_h^2=i\omega\mu\sigma_h$, $i\omega\mu\sigma_v$, $\omega$ is the circular frequency of the current in the transmitter, $\sigma_h$ is the horizontal component of the conductivity and $\sigma_v$ is the vertical component of the conductivity. By differentiating the expressions (7)-(12) in the direction $n_{Ar}$, we find the components of the gradient tensor $\hat{G}$.

Figure 6:
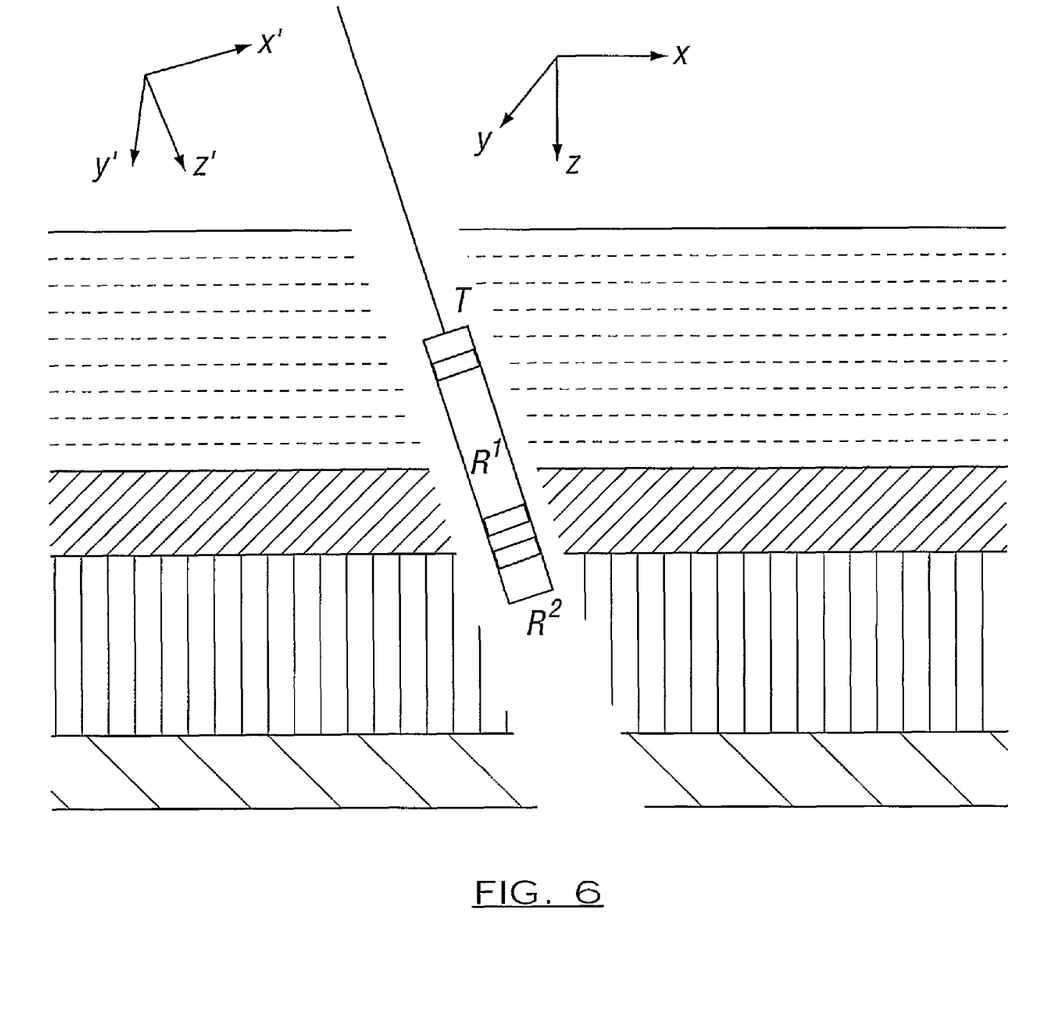
FIG. 6 illustrates the tensor gradient induction instrument in an earth formation with several dipping beds with different vertical and horizontal resistivities, where the x', y', and z' axes correspond to the coordinate system of the instrument, and the x, y, and z axes correspond to the coordinate system of the anisotropic layered earth formation.

The magnetic field components are given in formulae (7)-(12) and, correspondingly, in expression (2) for the gradient tensor in a coordinate system defined by the horizontal and vertical principal axes of the transverse isotropic media. The oil and gas industry widely uses deviated wells and directional drilling. That is why it is important to study the GTIWL response in a deviated well, where the orientation of the transmitter and receiver coils will be arbitrary with respect to this coordinate system. In order to use the representation of the gradient tensor $\hat{G}$ for an instrument located in an arbitrary orientation with respect to the tensor principal axes, it is necessary to transform the transmitter moment in the instrument frame (denoted by (x', y', z')) into the medium coordinates (denoted (x, y, z)), as it is shown in FIG. 6. This transformation can be made by application of the rotational matrix $\hat{R}$, given by $$\hat{R} = \begin{bmatrix} \cos\alpha\cos\beta & \cos\alpha\sin\beta & -\sin\alpha \\ -\sin\beta & \cos\beta & 0 \\ \sin\alpha\cos\beta & \sin\alpha\sin\beta & \cos\alpha \end{bmatrix}. \quad (13)$$

With the use of the rotational matrix, the relations between the matrix $\hat{G}'$ of the gradient tensor in the instrument coordinates and its matrix $\hat{G}$ in the coordinates defined by the conductivity tensor principal axes can be described by the following formula:

$$\hat{G}' = \hat{R}\hat{G}\hat{R}^{-1} = \hat{R}\hat{G}\hat{R}^T. \quad (14)$$

We should note, however, that both the conventional induction logging data and GTIWL data are strongly affected by the eddy currents flowing in the wellbore. This effect must be eliminated from the data, otherwise interpretation would be erroneous. The methods for the reduction of the wellbore effect were developed in the pioneering paper by Tabarovsky and Epov (1972). They introduced a "frequency focusing" technique based on induction voltage measurements at more than one frequency and combining the observed signal in a manner so that the effects of eddy currents flowing within the wellbore can be substantially eliminated from the final result. The further modifications of this technique can be found in U.S. Pat. No. 5,781,436 issued to Forgang et al.

In order to remove the borehole and invasion zone effects from the gradient induction logging data, one can calculate the dual frequency signal for every component of the gradient tensor:

$$G_d(f) = G_{f_1}(f_1) - \left(\frac{f_1}{f_2}\right) G_{f_2}(f_2), \quad (15)$$

where $G_d(f)$ is a dual component (A/m), and $f_1$ and $f_2$ are operating frequencies (Hz). $G_{f_1}(f_1)$ and $G_{f_2}(f_2)$ are the corresponding components of the gradient tensor G given by equation (2), observed or calculated at these frequencies. As we can see a dual component can be calculated by measuring gradient of the magnetic field components at two various frequencies. In practice, the quadrature (imaginary) components are usually used for conductivity calculation.

We will present below, as an example, the dual frequency signals for the different components of the gradient tensor (2) in a simple case of a vertical borehole within a horizontally layered anisotropic formation. In this case, the vertical magnetic field component (coaxial) can be given by the formula (Zhdanov et al., 2001):

$$H_z^z = \frac{e^{ik_h L}}{2\pi L^3}(1 - ik_h L), \quad (16)$$

where $k_h = \sqrt{i\omega\mu_0\sigma_h}$ is a horizontal wave number, $\sigma_h(=1/\rho_h)$ (S/m) is a horizontal conductivity (or resistivity), $\mu = \mu_0 = 4\pi 10^{-7}$ (H/m) is the free-space magnetic permeability, $\omega$ is an angular frequency with $\omega = 2\pi f$, and L is the distance between transmitter and receiver. The coaxial magnetic dual component is written as:

$$H_{zd}^z(f_1, f_2) = \frac{e^{ik_{h_1} L}}{2\pi L^3}(1 - ik_{h_1} L) - \left(\frac{f_1}{f_2}\right)\frac{e^{ik_{h_2} L}}{2\pi K^3}(1 - ik_{h_2} L). \quad (17)$$

where $k_{h_1} = \sqrt{i\omega_1\mu_0\sigma_h}$, $k_{h_2} = \sqrt{i\omega_2\mu_0\sigma_h}$, $\omega_1 = 2\pi f_1$, and $\omega_2 = 2\pi f_2$.

In a similar way we can write a horizontal (coplanar) component of magnetic field in an anisotropic medium:

$$H_x^x = -\frac{e^{ik_h L}}{4\pi L^3}\left(1 - ik_h L - \frac{1+\lambda^2}{2\lambda^2} k_h^2 L^2\right), \quad (18)$$

where $\lambda = \sqrt{\sigma_h/\sigma_v}$ is an anisotropy coefficient, and $\sigma_v$ is the vertical conductivity of the medium. The coplanar magnetic dual component is written as:

$$H_{xd}^x(f_1, f_2) = -\frac{e^{ik_{h_1} L}}{4\pi L^3}\left(1 - ik_{h_1} L - \frac{1+\lambda^2}{2\lambda^2} k_{h_1}^2 L^2\right) + \left(\frac{f_1}{f_2}\right)\frac{e^{ik_{h_2} L}}{4\pi L^3}\left(1 - ik_{h_2} L - \frac{1+\lambda^2}{2\lambda^2} k_{h_2}^2 L^2\right). \quad (19)$$

Using the same approach, one can write the corresponding dual signals for every component of the induction tensor. In the case of the deviated borehole and arbitrary orientation of the instrument with respect to the medium coordinate frame (with respect to the layered formations), the expressions for the magnetic field components can be obtained from corresponding formulas developed in the medium coordinate system, by application of the rotational transformation (14) (Zhdanov et al., 2001).

In the case of the gradient instrument, we measure the spatial derivatives of the corresponding magnetic field components. For example, the vertical derivative of the vertical coaxial magnetic dual component is written as:

$$G_{zd}^z(f_1, f_2) = \frac{e^{ik_{h_1} L}}{2\pi L^4}\left[-3 + 3ik_{h_1} L + k_{h_1}^2 L^2\right] - \left(\frac{f_1}{f_2}\right)\frac{e^{ik_{h_2} L}}{2\pi L^4}\left[-3 + 3ik_{h_2} L + k_{h_2}^2 L^2\right]. \quad (20)$$

The vertical derivative of the coplanar magnetic dual component is given by the expression:

$$G_{xd}^x(f_1, f_2) = \quad (21)$$
$$-\frac{e^{ik_{h_1} L}}{4\pi L^4}\left[-3 + 3ik_{h_1} L + \left(\frac{1+3\lambda^2}{2\lambda^2}\right)k_{h_1}^2 L^2 - \frac{1+\lambda^2}{2\lambda^2} ik_{h_1}^3 L^3\right] - $$
$$\left(\frac{f_1}{f_2}\right)\frac{e^{ik_{h_2} L}}{4\pi L^4}\left[-3 + 3ik_{h_2} L + \left(\frac{1+3\lambda^2}{2\lambda^2}\right)k_{h_2}^2 L^2 - \frac{1+\lambda^2}{2\lambda^2} ik_{h_2}^3 L^3\right].$$

Figure 7:
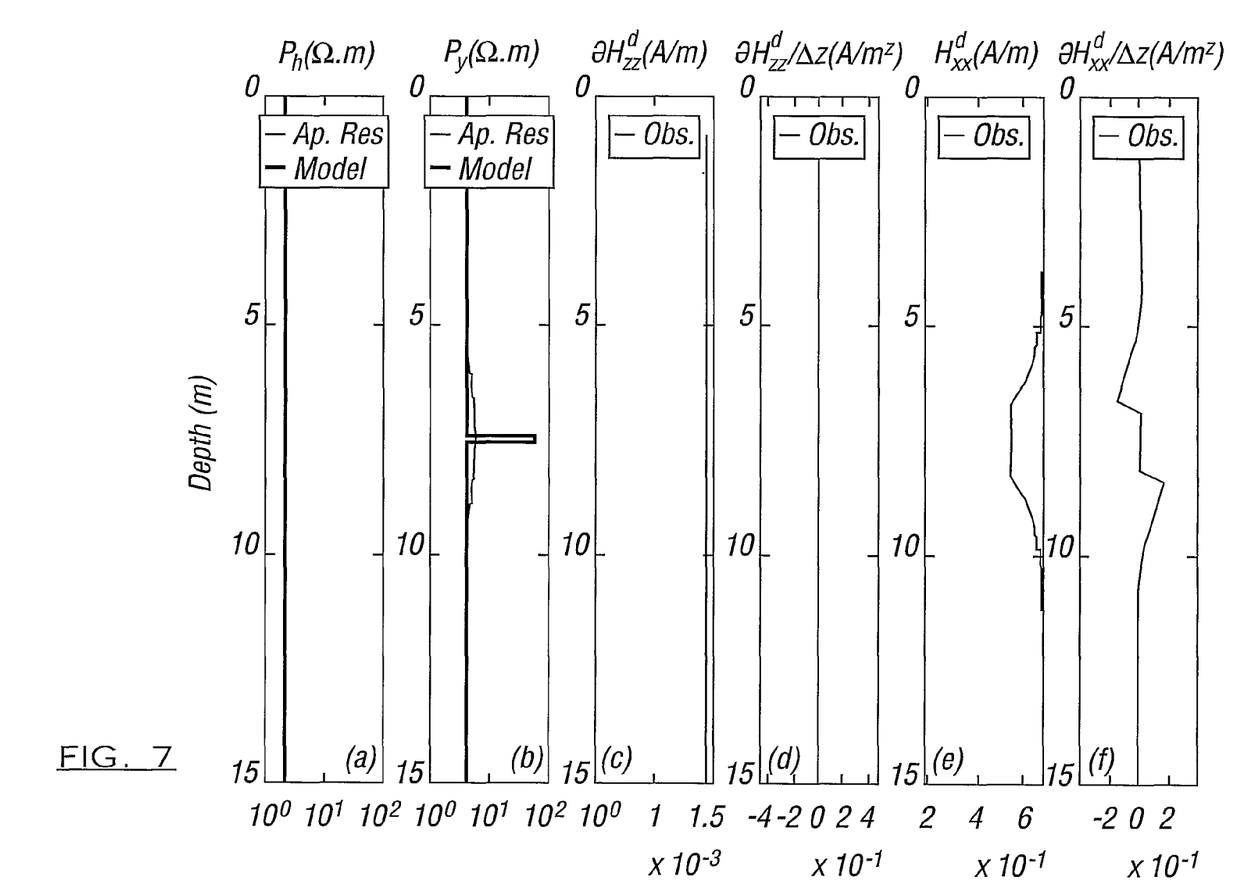

It is important to understand the basic difference between magnetic induction well logging data measured by conventional instruments and gradient magnetic data measured by the new gradient induction instruments of this invention. FIG. 7 shows the graphs of the theoretical induction logs and gradient induction logs for a three-layer anisotropic model with the middle layer having a horizontal resistivity of $\rho_h = 1$ Ohm-m, a vertical resistivity of $\rho_v = 100$ Ohm-m, and a thickness of 0.1 m. The horizontal and vertical resistivities of the upper and lower layers are equal to 1 Ohm-m and 5 Ohm-m, respectively. Therefore, in this model there is no variation in the horizontal resistivity (see panel a), while there is a thin intermediate layer with the anomalous vertical resistivity (see panel b). The dual frequency $H_{zd}^z$ and $H_{xd}^x$ data are presented in panels (c) and (e), respectively; panels (d) and (f) illustrate the dual frequency gradient components versus depth, $\partial H_{zd}^z / \partial z$ and $\partial H_{xd}^x / \partial z$, respectively. The operating frequencies are 20 and 200 kHz. One can see that the standard induction log (panel c) and the vertical gradient of this log (panel d) cannot determine the presence of the middle layer, because they both are sensitive to the horizontal resistivity only. The $H_{xd}^x$ component, and specially its vertical gradient $\partial H_{xd}^x / \partial z$, clearly indicate the presence of an intermediate layer with high vertical resistivity (panels e and f).

Figure 8:
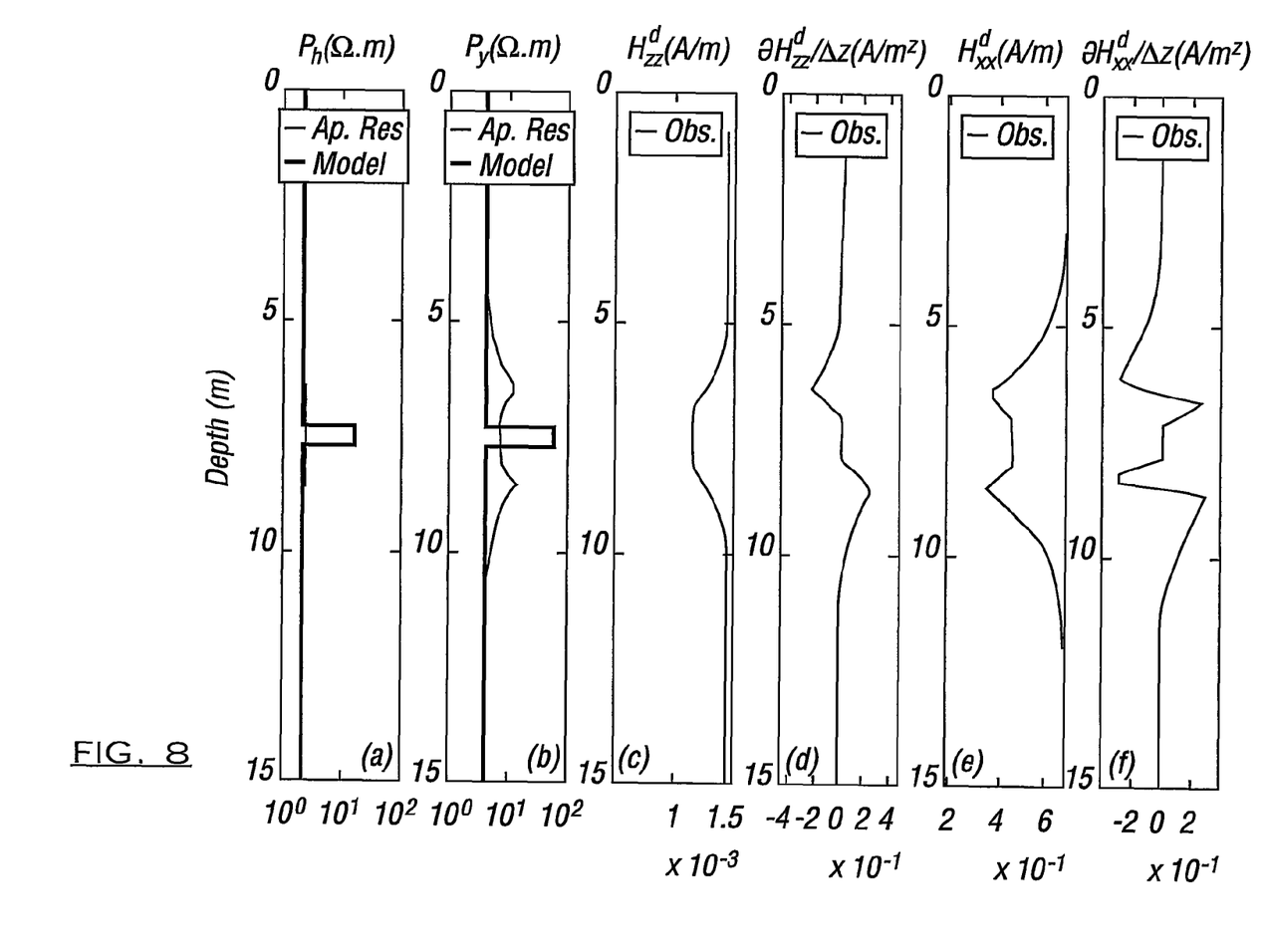

We can observe a similar effect in a three-layer anisotropic model with the middle layer having a horizontal resistivity of $\sigma_h = 10$ Ohm-m, a vertical resistivity of $\sigma_v = 100$ Ohm-m, and a thickness of 0.5 m, presented in FIG. 8. In this model the intermediate layer is different from the background section in both the horizontal and vertical resistivities. Therefore, we observe the anomalous behavior in all four induction logs, which are shown in panels (c)-(f) of FIG. 8. However, the most visible anomaly is observed in the log of the vertical gradient $\partial H_{xd}^x / \partial z$ (panel f).

One can see from expressions (20) and (21) that the dual frequency signals are the functions of the horizontal, $\sigma_h$, and vertical, $\sigma_v$, conductivities. Our goal is to find these conductivities from the observed data. This is obviously a nonlinear inverse problem. This problem can be solved by applying the regularized Newton method as described by Zhdanov (2002):

$$r_n = B(\sigma_n) - g, \quad (22)$$

$$l_n^{v_n} = l_n^v(\sigma_n) = F_n^T r_n + v_n(\sigma - \sigma_{apr}), \quad (23)$$

$$H_n = F_n^T F_n + v_n I, \quad (24)$$

$$\sigma_{n+1} = \sigma_n - H_n^{-1} l_n^{v_n}, \quad (25)$$

where B is a nonlinear operator of the forward modeling described by the corresponding formulas for dual frequency signals (see, for example, formulae (20) and (21) for a homogeneous anisotropic medium). The suitable forward modeling method for the purpose of calculations of the predicted GTIWL data $B(\sigma_n)$ is disclosed in Zhdanov et al., 2001. Vector g is formed by the observed data (dual frequency gradient magnetic field signal), $\sigma_n$ is a vector of model parameters (horizontal and vertical conductivities, $\sigma_h$ and $\sigma_v$, and the relative deviation angle $\alpha$ of the borehole) on the nth iteration, $\sigma_{apr}$ is the a priori model, r is a residual vector of the difference between the predicted, $B(\sigma_n)$, and observed data; $F_n$ is a Frechet derivative matrix; $H_n$ is a quasi Hessian matrix; and $l_n^{v_n}$ is the regularized direction of the Newton method on the nth iteration.

The regularization parameter $v$ is updated on each iteration according to a progression of numbers:

$$v_k = v_0 q^k; \; k=0, 1, 2, \ldots, n; \; q>0. \quad (26)$$

The first iteration of the Newton method is run with $v=0$. The initial value of the regularization parameter ($v_0$) is determined after the first iteration ($\sigma_1$) as the ratio:

$$v_0 = \frac{\|B(\sigma_1) - g\|^2}{\|\sigma_1 - \sigma_{apr}\|^2}.$$

For any number ($v_k$) we calculate the misfit $\|B(\sigma_{v_k}) - g\|^2$. The optimal value of the parameter $v$ is the number $v_{k0}$, for which we have satisfied the misfit condition:

$$\|B(\sigma_{v_{k0}}) - g\|^2 = \delta, \quad (27)$$

where $\delta$ is the level of noise in the observed data.

There are three unknown model parameters: the relative deviation angle $\alpha$ and the horizontal and vertical conductivities, $\sigma_h$ and $\sigma_v$. Therefore, the Frechet derivative matrix can be calculated directly by taking derivatives of the corresponding expressions for the dual frequency signals with respect to unknown parameters. The matrix is:

$$F = \begin{bmatrix} \frac{\partial G_{xd}^x}{\partial \sigma_h} & \frac{\partial G_{xd}^z}{\partial \sigma_v} & \frac{\partial G_{xd}^x}{\partial \alpha} \\ \frac{\partial G_{zd}^x}{\partial \sigma_h} & \frac{\partial G_{zd}^x}{\partial \sigma_v} & \frac{\partial G_{zd}^z}{\partial \alpha} \\ \frac{\partial G_{yd}^y}{\partial \sigma_h} & \frac{\partial G_{yd}^y}{\partial \sigma_v} & \frac{\partial G_{yd}^y}{\partial \alpha} \\ \frac{\partial G_{zd}^z}{\partial \sigma_h} & \frac{\partial G_{zd}^z}{\partial \sigma_v} & \frac{\partial G_{zd}^z}{\partial \alpha} \end{bmatrix}. \quad (28)$$

In the Newton algorithm, the calculations start with an initial guess, which usually is set equal to the a priori model, $\sigma_0 = \sigma_{apr}$, and then updated on each iteration according to (25). The method is fast and converges after four-six iterations.

In a general case, the Newton routine solves for three parameters at each GTIWL observation point. In a preferred embodiment of the invention, the Newton method described above is used to determine the apparent horizontal and vertical conductivities of the medium, and the relative deviation angle from the GTIWL data.

Figure 9:
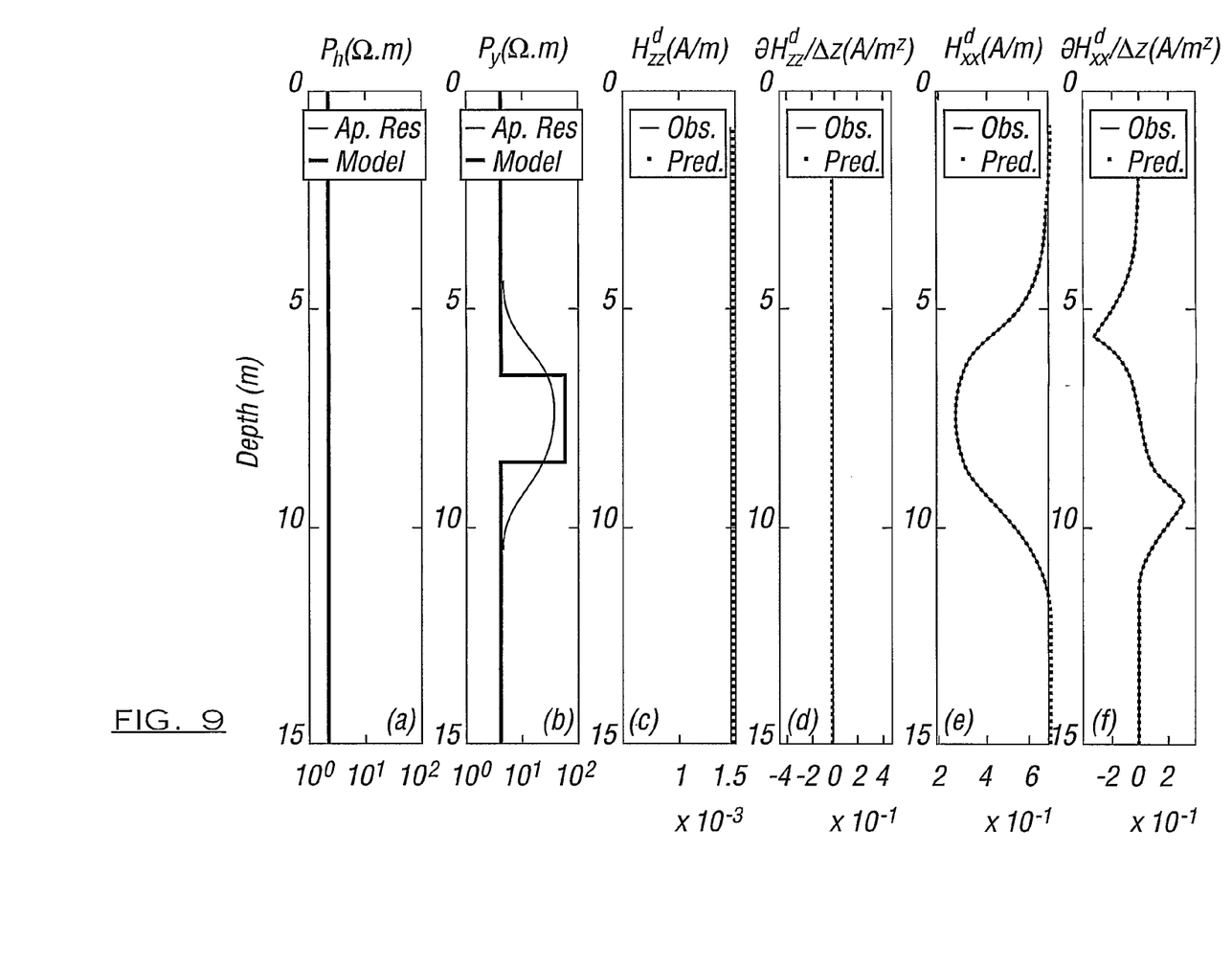

FIG. 9 shows an example of the apparent resistivity determination from the GTIWL data using the Newton method for a three-layer anisotropic model with the middle layer having a horizontal resistivity of $\rho_h=1$ Ohm-m, a vertical resistivity of $\rho_v=100$ Ohm-m, and a thickness of 2 m. We can see that the apparent vertical resistivity (thin solid line in panel b) describes well the true resistivity of the model. The predicted and observed data are shown by dotted and solid lines in panels (c) and (d), (e) and (f), respectively. One can see that the predicted data fit the observed data very well.

Figure 10:
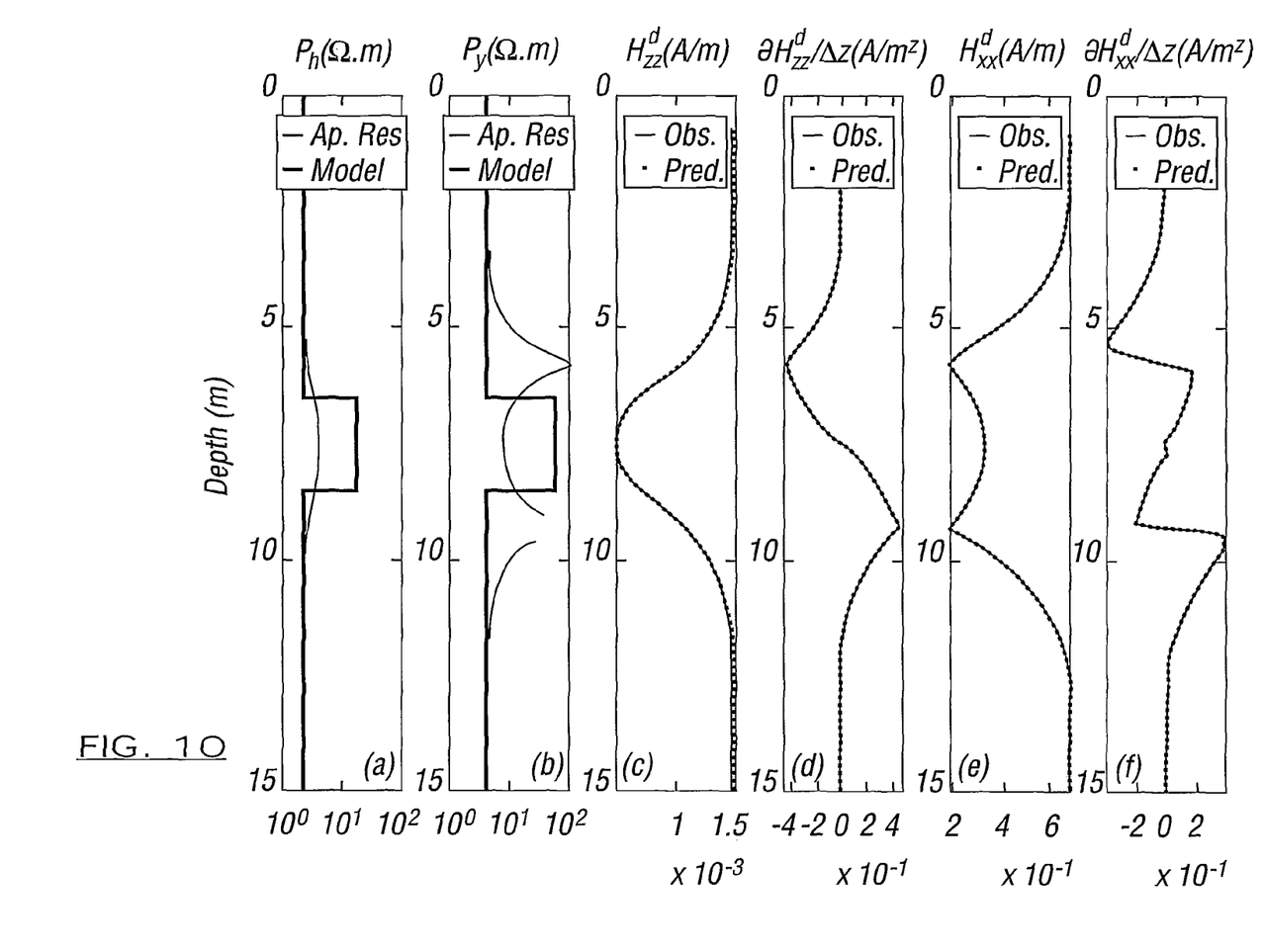

FIG. 10 shows a similar example for a three-layer anisotropic model with the middle layer having a horizontal resistivity of $\rho_h=10$ Ohm-m, a vertical resistivity of $\rho_v=100$ Ohm-m, and a thickness of 2 m. In this case, the apparent resistivities provide some indication about the location and the electrical resistivity of the intermediate layer, but do not describe the true resistivity profiles well enough. We observe the typical polarization horns in the apparent vertical resistivity curve (panel b). In this situation the apparent resistivities can be used as the starting models for the iterative non-linear inversion for the layered model parameters.

Another embodiment of the claimed subject matter exists when the gradient magnetic field measurements are used for determining the electrical conductivity of the multilayered anisotropic formations with the borehole arbitrarily oriented with respect to the bedding plane. In this case vector $\sigma$ of the model parameter distributions consists of logarithms of horizontal and vertical conductivities (ln $\sigma_{hi}$ and ln $\sigma_{vi}$, i=1, ..., N), where sample layers forming a 1-D geoelectrical inverse model:

$$\sigma = [\ln \sigma_{h1}, \ln \sigma_{v1}, \ln \sigma_{h2}, \ln \sigma_{v2}, \ln \sigma_{h3}, \ln \sigma_{v3} \ldots \ln \sigma_{hN}, \ln \sigma_{vN}],$$

and N is a number of sample layers. The induction logging inverse problem consists of finding a 1-D distribution of model parameters ($\sigma$) that correspond to an observed discrete set of gradient tensor induction data (d). The solution of this problem is nonunique and ill-posed. In the preferred embodiment of the invention we apply the regularization method, given by Tikhonov and Arsenin (1977) and Zhdanov (2002), which is reduced to solving the following minimization problem:

$$P^v(\sigma) = \phi(\sigma) + v S(\sigma) = \min, \quad (29)$$

where $P^v(\sigma)$ is the parametric functional, $\phi(\sigma)$ is a misfit functional, $v$ is a regularization parameter, and $S(\sigma)$ is a stabilizing functional. The misfit functional is chosen as the following form, $$\phi(\sigma) = \|\hat{W}_d(\hat{B}\sigma - g)\|_{L_2}^2, \quad (30)$$

where $\hat{W}_d$ is a data weighting matrix. We follow the ideas of the general method of sharp boundary inversion (Zhdanov, 2002), and use the minimum gradient support stabilizing functional:

$$S(\sigma) = S_{MGS}(\sigma) = \left\| \frac{|grad\sigma|}{(|grad\sigma|^2 + e^2)^{1/2}} \right\|_{L_2}^2. \quad (31)$$

The solution of the minimization problem (29) can be obtained by the same Newton method (22)-(25) outlined above.

Another embodiment comprises the multifrequency measurements of the GTIWL data for conducting a frequency gradient EM sounding of the medium at different distances from the wellbore. In this case a selected volume of the medium surrounding the borehole is descretized in the large number of small cells having constant horizontal and vertical conductivities. Vector σ of the model parameter distributions consists of logarithms of horizontal and vertical conductivities ($\ln \sigma_{hi}$ and $\ln \sigma_{vi}$, i=1, . . . , N) of the different cells:

$$\sigma = [\ln \sigma_{h1}, \ln \sigma_{v1}, \ln \sigma_{h2}, \ln \sigma_{v2}, \ln \sigma_{h3}, \ln \sigma_{v3} \ldots \ln \sigma_{hN}, \ln \sigma_{vN}],$$

where N is a number of cells. The induction logging inverse problem consists of finding a 3-D distribution of model parameters (σ) that corresponds to an observed discrete set of the multi-frequency gradient tensor induction data (d). The solution of this problem is based on the same principles of the regularization theory outlined in the previous embodiment of this invention.

REFERENCES CITED

U.S. Patent Documents

U.S. Pat. No. 5,666,057 September/1997 Beard et al.
U.S. Pat. No. 5,781,436/1998 Forgang et al.
U.S. Pat. No. 5,886,526 Wu
U.S. Pat. No. 5,966,013 Hagiwara
U.S. Pat. No. 5,999,883 Gupta et al.
U.S. Pat. No. 6,393,364 Gao et al.
U.S. Pat. No. 6,556,016 B2/2003 Gao et al.
    Other Publications
Doll, H. G., Introduction to Induction Logging of Wells Drilled with Oil Based Mud, Journal of Petroleum Technology, vol. 1, p. 148, Society of Petroleum Engineers, Richardson Tex. (1949)
Eidman, I. E., Soviet Patent 272448 (1970)
Kaufman, A. A., and Kaganskii, A. M., Induction Method of Studying Transverse Resistance in Boreholes, Nauka Press, Novosibirsk (1972).
Klein, J. D., Martin, P. R., and Allen, D. F., The Petrophysics of Electrically Anisotropic Reservoirs. The Log Analyst, vol. 33, no. 3, pp. 25-36 (1997).
Tabarovsky. L. A., Epov, M. I., Geometric and Frequency Focusing in Exploration of Anisotropic Seams. Nauka, USSR Academy of Sciences. Siberian Division, Novosibirsk. pp. 67-129 (1972).
Tabarovsky. L. A., Kaganskii, A. M., and Epov, M. I., Electromagnetic Field of a Harmonic Source in an Anisotropic Cylindrically Layered Medium. Soviet Geology and Geophysics, vol. 17, pp. 74-79 (1976).
Tikhonov, A. N., and Arsenin, V. Y., Solution of ill-posed problems: Wilson and Sons. (1977)
Zhdanov, M. S., Kennedy, D., and Peksen, E. Foundations of Tensor Induction Well-logging. Petrophysics, vol. 42, no. 6, pp. 588-610 (2001).
Zhdanov, M. S., Geophysical inverse theory and regularization problems: Elsevier (2002).

What is claimed is:

1. Gradient tensor induction magnetic field measuring apparatus for measuring a gradient tensor induction magnetic signal of a transient magnetic field in a wellbore to be used to determine a conductivity gradient of an anisotropic earth formations penetrated by the wellbore, the apparatus comprising e, f and any or any combination of a)-b), wherein:
    a) at least one transmitter coil and a pair of closely located parallel tri-axial EM induction receivers, each formed by three mutually orthogonal receiver coils, separated by a small vector, Δr, wherein a distance between the two parallel tri-axial EM induction receivers is much smaller than a distance L between the transmitter and a center of the vector Δr, connecting the two receivers, wherein conditions are fulfilled that the gradients are measured of different components of the magnetic field induced in the earth formation;
    b) at least one receiver coil and a pair of closely located parallel tri-axial EM induction transmitter coils, separated by a small vector, Δr, wherein a distance between the two parallel tri-axial EM induction transmitters is much smaller than a distance L between the receiver and a center of the vector Δr, connecting the two transmitters, wherein conditions are fulfilled, based on a reciprocity principal, that gradients are measured of different components of the magnetic field induced in the earth formation;
    e) means for receiving voltages induced in said receiver coils; and
    f) means for measuring a difference between the said voltages in the different pairs of the receivers, or due to the different pairs of the transmitters.

2. The apparatus as defined in claim 1 further comprising:
    a) a tri-axial transmitter array and three pairs of receiver coils, measuring $\partial H_z^\beta/\partial x$, $\partial H_x^\beta/\partial z$, and $\partial H_y^\beta/\partial x$ (β=x, y, z) components;
    b) a tri-axial transmitter array and three pairs of receiver coils, measuring $\partial H_z^{\beta/\partial z}$, $\partial H_x^\beta/\partial z$, and $\partial H_y^\beta/\partial z$ (β=x, y, z) components;
    c) a tri-axial transmitter array and up to 27 pairs of receiver coils, measuring some or all components of $\partial H_\alpha^\beta/\partial \gamma$ (α, β, γ=x, y, z);
    d) three mutually orthogonal transmitter coils, displaced along a z-axis and oriented in x-, y-, and z-directions, and three pairs of receiver coils, measuring $\partial H_z^\beta/\partial x$, $\partial H_x^\beta/\partial z$, and $\partial H_y^\beta/\partial x$ (β=x, y, z) components;
    e) three mutually orthogonal transmitter coils, displaced along z-axis and oriented in the x-, y-, and z-directions, and three pairs of receiver coils, measuring $\partial H_z^\beta/\partial z$, $\partial H_x^\beta/\partial z$, and $\partial H_y^\beta/\partial z$ (β=x, y, z) components;
    f) three mutually orthogonal transmitter coils, displaced along z-axis and oriented in the x-, y-, and z-directions, and up to 27 pairs of receiver coils, measuring some or all components of $\partial H_\alpha^\beta/\partial \gamma$ (α, β, γ=x, y, z).

3. A method for measuring conductivity of an anisotropic earth formations penetrated by a wellbore, the method comprising:
    a) measuring a gradient of magnetic field between two closely positioned parallel receiver coils, wherein a harmonic (frequency domain) electromagnetic field is generated by at least one transmitter coil, and the receiver coils are separated by a small vector, Δr, with a magnetic moment direction of the transmitter coil parallel or different from a magnetic moment direction of the receiver coils, wherein a distance between two parallel receiver coils being much smaller than a distance L between the transmitter and a center of the vector Δr, connecting two receivers, and the receiver pair measures the gradient of the induction magnetic field;
    b) obtaining a plurality of measurements for different positions along the wellbore;
    c) obtaining from said plurality of measurements a horizontal and vertical conductivities of a medium, and a relative dip angle of the formation by inverting the gradient electromagnetic induction data using a model of a layered anisotropic formation and regularization methods of inverse problem solution.

4. The method of claim 3, further comprising generating a frequency domain current in the transmitter for at least several frequencies, and the receivers measure a signal at several frequencies, wherein multi-frequency gradient measurements are used for frequency gradient EM sounding of the medium at different distances from the wellbore to produce a volume image of anisotropic conductivity distribution around the borehole.

5. A method for measuring conductivity of an anisotropic earth formations penetrated by a wellbore, the method comprising:
  a) measuring a gradient of a magnetic field at a receiver coil position, wherein a harmonic (frequency domain) or pulse (time domain) electromagnetic field is generated by two closely positioned parallel transmitter coils, separated by a small vector, $\Delta r$, with a magnetic moment direction of the transmitters parallel or different from a magnetic moment direction of the receiver, wherein two transmitters generate successively a harmonic (frequency domain) primary EM field which propagates through the anisotropic formation, surrounding the wellbore;
  b) obtaining a plurality of measurements for different positions along the wellbore;
  c) obtaining from said plurality of measurements a horizontal and vertical conductivities of a medium and a relative dip angle of the formation by inverting gradient electromagnetic induction data, using a model of layered anisotropic formation and regularization methods of an inverse problem solution.

6. The method of claim 5, further comprising generating a frequency domain current in the transmitter for at least several frequencies, and the receivers measure a signal at several frequencies, wherein multi-frequency gradient measurements are used for frequency gradient EM sounding of the medium at different distances from the wellbore to produce a volume image of an anisotropic conductivity distribution around the wellbore.

* * * * *